(12) United States Patent
McQueen (10) Patent No.: US 9,950,332 B2
(45) Date of Patent: Apr. 24, 2018

(54) APPARATUS AND METHOD FOR ROTATING CYLINDRICAL MEMBERS AND COATING INTERNAL SURFACE OF TUBULARS

(71) Applicant: Joe C. McQueen, Odessa, TX (US)

(72) Inventor: Joe C. McQueen, Odessa, TX (US)

( * ) Notice: Subject to any disclaimer, the term of this patent is extended or adjusted under 35 U.S.C. 154(b) by 291 days.

(21) Appl. No.: 14/687,710

(22) Filed: Apr. 15, 2015

(65) Prior Publication Data

US 2016/0303604 A1    Oct. 20, 2016

(51) Int. Cl.
| | | |
|---|---|---|
| *B05B 13/02* | (2006.01) | |
| *B05D 1/02* | (2006.01) | |
| *B05C 19/00* | (2006.01) | |
| *B05B 7/14* | (2006.01) | |
| *B05B 13/06* | (2006.01) | |
| *F16L 58/10* | (2006.01) | |

(52) U.S. Cl.
CPC ........ *B05B 13/0207* (2013.01); *B05B 7/1463* (2013.01); *B05B 7/1486* (2013.01); *B05B 13/0645* (2013.01); *B05D 1/02* (2013.01); *F16L 58/1045* (2013.01); *B05C 19/007* (2013.01)

(58) Field of Classification Search
None
See application file for complete search history.

(56) References Cited

U.S. PATENT DOCUMENTS

| | | |
|---|---|---|
| 2,146,305 A | 2/1939 | Link |
| 2,420,620 A * | 5/1947 | Remington ............... B05C 7/02 |
| | | 118/317 |
| 2,602,415 A | 7/1952 | Hall |
| 2,873,716 A | 2/1959 | Daniel et al. |
| 3,434,758 A | 3/1969 | Fry |
| 3,687,704 A | 8/1972 | Stanley et al. |
| 3,850,660 A | 11/1974 | Inamura et al. |
| 3,974,306 A | 8/1976 | Inamura et al. |
| 3,982,050 A | 9/1976 | Kato et al. |
| 4,089,998 A | 5/1978 | Gibson |
| 4,243,699 A | 1/1981 | Gibson |

(Continued)

OTHER PUBLICATIONS

PCT/ISA/210, International Search Report, Issued by USPTO, dated Jul. 8, 2016.

(Continued)

*Primary Examiner* — Jethro M Pence (57) ABSTRACT

Methods and systems comprising a first and a second powder coating apparatus, with each apparatus comprising a tubular barrel having an axial bore extending longitudinally therethrough, are usable for coating an interior surface of a tubular member. Each coating apparatus comprises a conical member connected with the tubular barrel and at least one gas conduit connected to the tubular barrel for communicating gas into the tubular barrel. The at least one gas conduit contains a gas flow control valve connected thereto for controlling the volumetric flow rate of gas through the at least one gas conduit. Each coating apparatus further comprises at least one container for holding a coating material, an inlet conduit for communicating the coating material into the axial bore of the tubular barrel, and a plurality of gas nozzles connected to the tubular barrel for inducing spiraling gas flow through the axial bore of the tubular barrel.

10 Claims, 7 Drawing Sheets

(56) References Cited

U.S. PATENT DOCUMENTS

| | | | |
|---|---|---|---|
| 4,382,421 A | | 5/1983 | Warren et al. |
| 4,420,508 A | | 12/1983 | Gibson |
| 4,454,173 A | | 6/1984 | Koga |
| 4,668,534 A | | 5/1987 | Gray |
| 4,698,241 A | | 10/1987 | Roberson |
| 4,816,296 A | | 3/1989 | Gibson |
| 4,987,001 A | * | 1/1991 | Knobbe .................... B05B 5/12 |
| | | | 118/312 |
| 6,019,845 A | | 2/2000 | Nakakoshi |
| 6,053,420 A | | 4/2000 | Ahlbert et al. |
| 6,951,309 B2 | | 10/2005 | Buschor et al. |
| 8,061,296 B1 | | 11/2011 | Batur |
| 2011/0244125 A1 | * | 10/2011 | Weisenberg ............. B05D 7/22 |
| | | | 427/236 |

OTHER PUBLICATIONS

PCT/ISA/237, Written Opinion of the International Searching Authority, issued by the USPTO, dated Jul. 8, 2016.

\* cited by examiner

APPARATUS AND METHOD FOR ROTATING CYLINDRICAL MEMBERS AND COATING INTERNAL SURFACE OF TUBULARS

FIELD

The present invention relates generally to powder coating apparatus and methods of use, and more specifically, to apparatus and methods usable for rotating cylindrical members and coating the internal surfaces of the cylindrical members, including tubulars, pipe and the like.

BACKGROUND

Coating the inside of tubular members or tubulars, such as oilfield pipe, is well known in the art. Coating the inside of the tubular, by applying a material to the inside diameter or inside surface of the tubular which has been heated previously, is used to prevent corrosion and erosion of the inside surface. Additionally, pipe are often coated in order to reduce friction of the inside surface, as pipe that have been coated require less pressure to pump fluid therethrough, due to the reduced friction.

With recent advances in material science and increased demand for deeper and wider wells, downhole pipe lengths and diameters are increasing. The increased pipe lengths have limited the usefulness of prior coating devices, as these coating devices are unable to provide a uniform interior coating over an extended pipe length or a large pipe diameter. Despite the improvements in powder coating technology, problems of uneven coating thickness or gaps of bare metal on the inside surface of tubular goods have persisted.

Some existing devices have relied on introducing an excessive amount of coating material in order to ensure that the entire interior surface is coated. This procedure includes a thick application of material to the interior of the tubular, which can result in a coating layer that is too thick at one end and too thin at the opposite end. Furthermore, these existing coating devices are not adjustable to tubulars having different lengths and/or diameters. As such, each different pipe size or length requires a different volumetric flow rate therethrough, during coating operations, to maintain the desired powder velocities through the pipe for optimal coating formation.

Changes in pressure within the pipe during coating operations can also cause changes in the velocity of the coating material particles. A thick coating at the load end can result, where the particles have a long dwell or residence time upon initial loading. In addition, just downstream of the load end, a zone of reduced coating thickness can result from the sudden increase in particle velocity. Further, a zone of increasing coating thickness, toward the discharge end of the pipe, can result as the velocity of the particles through the pipe is reduced due to friction and decreased pressure. If increased air pressure is used to compensate for this action, the powder particles will have a greater velocity and will tend to pass through the discharge end without sufficient residence time to melt on the pipe wall, resulting in yet another zone of decreased film thickness. The number of bare metal gaps also tends to increase within the zone of decreased coating or film thickness.

Additionally, weld splatter inside the tubulars, which are manufactured with welded seams, is a common source of coating problems. Specifically, as some weld splatter is not removed when the pipe is cleaned prior to applying the coating, the splatter becomes part of the interior of the tubulars. Previous methods and devices for applying coating to the insides of tubulars are unable to sufficiently cover the bumps and cavities caused by weld splatter because of the improper rates of tubular rotation or improper powder velocities through the tubular.

Yet another drawback of previous devices is that they were unable to ensure constant rotation speeds for variously sized pipe. These previous devices are not automatically adjustable to tubulars having different diameters, wherein each differently sized diameter of the tubulars can rotate at a different speed to cause non-uniform rotation and application.

A further drawback of previous devices is that they rely on a human operator for controlling each step of the coating operations, which results in significant time delays over extended periods of operation.

Therefore, as the previous devices are totally or partially ineffective and deficient in coating the inside surface of tubulars, there is a need to provide improved apparatus and methods for uniformly applying a powdered coating material to the interior of tubulars, regardless of the diameter and/or length of the tubulars.

There is a need for providing a coating device that is adjustable to different tubular diameters, wherein the coating device can be adjusted to supply the necessary volumetric air flow rates into the tubulars to generate and maintain desired powdered coating material velocities during coating operations over the entire length of the tubulars, including tubulars having an extended length.

There is a need in the art for providing a coating device which rotates tubulars, no matter what their diameter, at a constant, predetermined speed.

There is also a need for providing a coating device that can automate each step of the coating operations, minimizing time delays between each phase of the coating operations.

Embodiments usable within the scope of the present disclosure meet these needs.

SUMMARY

The present disclosure is directed to a system for coating an interior surface of a tubular member. An embodiment of the system can comprise a first coating apparatus and a second coating apparatus, each comprising an elongated barrel having a first end, a second end, and an axial bore extending longitudinally therethrough. Each coating apparatus can further comprise a conical member connected with the elongated barrel at the first end thereof, and a plurality of gas conduits connected to the elongated barrel. The conical members can connect with an end of the tubular member, and the plurality of gas conduits can communicate pressurized gas into the axial bore of the elongated barrel. Each gas conduit can further contain a gas flow control valve connected thereto for controlling the flow of gas through the gas conduit, wherein each flow control valve can control the flow of gas through each gas conduit independently from the other flow control valve. Each coating apparatus can comprise a first container for holding therein a coating material, an inlet conduit connected to the elongated barrel, and a plurality of gas nozzles connected to the elongated barrel. The inlet conduit can communicate the coating material from the first container into the axial bore of the elongated barrel and the inlet conduit can be connected to the elongated barrel between the plurality of gas conduits and the first end of the elongated barrel. The plurality of gas nozzles can introduce pressurized gas into the axial bore of the elongated barrel to induce a spiraling gas flow through the axial bore, toward the first end of the elongated barrel. The spiraling gas flow can cause the coating material to spiral as the coating material moves through the axial bore and the tubular member.

The present disclosure is further directed to a system for moving and rotating cylindrical members during coating and cleaning operations. An embodiment of the system comprises a first rotator apparatus and a second rotator apparatus positioned at a distance from each other. Each of the first and the second rotator apparatus can comprise a first wheel having a first axis of rotation and a second wheel having a second axis of rotation, wherein the first and second axes of rotation can be generally parallel. Each of the first and second rotators can further comprise an arm positioned adjacent the first and second wheels, wherein the arm can extend generally perpendicularly with respect to the first and second axes of rotation and can have a downwardly sloping upper edge. Each arm can receive a cylindrical member thereon and can move in an upward and/or downward direction. When moving in the downward direction, each arm can position the cylindrical member between the first and second wheels. When moving in the upward direction, each arm can move the cylindrical member from between the first and second wheels.

The present disclosure is further directed to a method for moving and rotating tubular members during coating and cleaning operations. The method can comprise the steps of providing a first rotator apparatus, comprising a first set of wheels and a first arm positioned adjacent to the first set of wheels, and providing a second rotator apparatus, comprising a second set of wheels and a second arm positioned adjacent to the second set of wheels. Each of the first arm and second arms can have an upper edge that can be downwardly sloping. The method can further comprise the steps of positioning a tubular member on the first and second upper edges, rolling the tubular member along the first and second upper edges from a first side of the first and second arms toward the second side of the first and second arms, and stopping the tubular member from rolling along the first and second arms at an intermediate position between the first and second sides of the first and second arms. Further steps can include moving the first and second arms in a downward direction to position the tubular member in contact with the first and second sets of wheels, rotating the first and second sets of wheels to rotate the tubular member, moving the first and second arms in an upward direction to lift the tubular member off of the first and second wheels, and rolling the tubular member along the first and second upper edges, toward the second end of the first and second arms, for removal from the first and second rotator apparatus.

The present disclosure is directed also to methods for coating an interior surface of a tubular member. The methods can comprise the steps of capturing the tubular member between a first conical member and a second conical member, rotating the tubular member, establishing a swirling air flow through the first tubular barrel with a plurality of nozzles positioned along the tubular barrel, and drawing air from the second tubular barrel with a vacuum generator. Further method steps can include introducing coating material into the first tubular barrel, whereby the swirling air flow moves the coating material through the tubular member in a swirling manner; communicating air into the first tubular member through an air conduit that can be connected to the first tubular member, upstream from the plurality of nozzles, to move the coating material through the tubular member to coat the tubular member; and adjustably controlling the volumetric flow rate of the air communicated into the first tubular member through the air conduit.

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
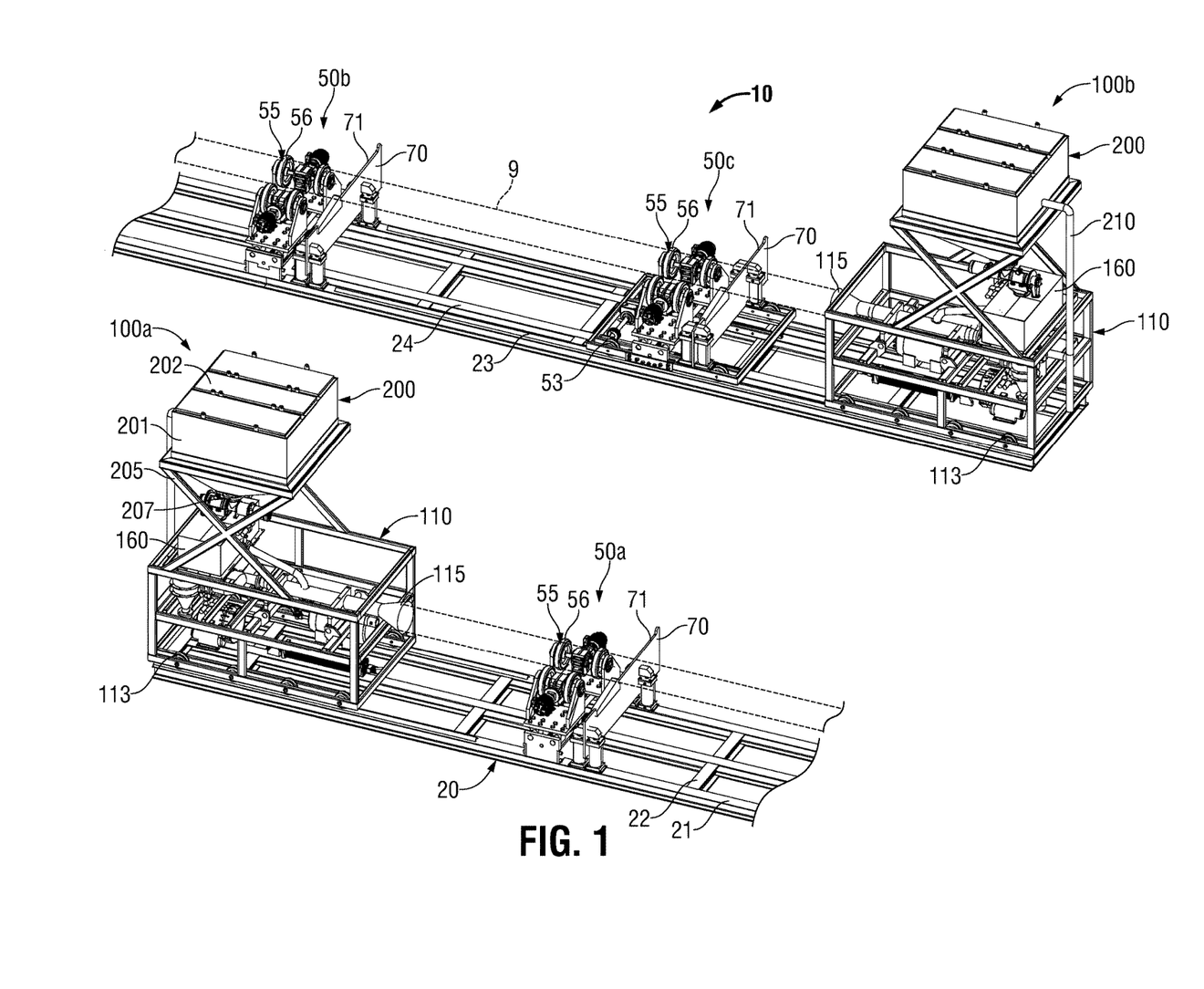
FIG. 1 depicts an isometric view of an embodiment of a powder coating system in accordance with the present disclosure.

Referring now to FIG. 1, an embodiment of a powder coating system (10) in accordance with the present disclosure is shown. The powder coating system (10) is shown comprising a first and a second coating apparatus (100a, 100b), positioned at opposite ends of the powder coating system (10), and three pipe rotating apparatus, referred to as rotators (50a-c), positioned between the first and second coating apparatus (100a, 100b). The coating apparatus (100a, 100b) and the rotators (50a-c) are shown positioned on a support frame (20), which supports and guides the motion of the coating apparatus (100a, 100b) and the rotators (50a-c) relative to each other. As further shown in FIG. 1 and explained below, during pipe coating operations, a length of pipe (9), or other tubular member, can be positioned on top of the rotator rollers (56) of the rotators (50a-c). Thereafter, the coating apparatus (100a, 100b) can move toward the pipe (9), and along the support frame (20), until each end of the pipe (9) is sealingly engaged within the opposing cones (115) of each coating apparatus (100a, 100b).

The rollers (56) can then rotate the pipe (9) while the first coating apparatus (100a) injects a first packet of powdered coating material (not shown), referred to from hereon as the coating material, into the pipe (9). Once the coating material travels the length of the pipe (9), the second coating apparatus (100b) can inject another packet of coating material into the opposite end of the pipe (9), wherein the second packet of coating material can travel through the pipe. After the coating cycles are complete, the coating apparatus (100a, 100b) can separate, allowing the pipe (9) to be removed and another pipe to be positioned for coating.

Referring still to FIG. 1, the support frame (20) is depicted comprising a plurality of longitudinal beams (21) and cross beams (22) adapted to support and guide the motion of the coating apparatus (100a, 100b) and the rotators (50a-c). Specifically, portions of the longitudinal beams (21) can comprise rails (23) or other longitudinal protrusions extending therefrom, which can be adapted to engage with the wheels (53, 113) of the coating apparatus (100a, 100b) and the third rotator apparatus (50c). The wheels (53, 113) can, therefore, roll along the support frame (20), wherein the rails (23) retain in position and guide the rolling motion of the wheels, enabling limited and/or guided movement between the coating apparatus (100a, 100b) and the third rotator (50c).

In other embodiments (not shown) of the powder coating system (10), the support frame (20) can guide the wheels (53, 113) by way of longitudinal channels that are incorporated along the longitudinal beams (21), wherein the channels guide the rolling motion of the wheels (53, 113). In yet another embodiment (not shown) of the powder coating system (10), the longitudinal beams (21) themselves can directly support and guide wheels that are adapted to be rolled thereon. In still another embodiment (not shown) of the powder coating system (10), the rails (23) or channels can extend the entire length of the support frame (20), allowing the first and second coating apparatus (100a, 100b) and the three rotators (50a-c) to move along any portion of the frame (20).

The support frame (20) is shown further comprising toothed bars (24), extending longitudinally between the longitudinal beams (21). The toothed bars (24) are depicted extending about half the length of the frame (20), below the third rotator (50c) and the second coating apparatus (100b). As explained herein, the toothed bars (24) are usable for moving the third rotator (50c) along the frame (20) when engaged by rotating gears of the corresponding drive assembly (85, see FIG. 2C). In another embodiment (not shown) of the powder coating system (10), the toothed bars (24) can extend the entire length of the support frame (20), allowing the drive assemblies ((85), shown in FIG. 2C) of the first and second coating apparatus (100a, 100b) and the three rotators (50a-c) to engage the toothed bars (24) to move the first and second coating apparatus (100a, 100b) and the three rotators (50a-c) along the frame (20).

The powder coating system (10), depicted in FIG. 1, is shown comprising a first, second, and third rotators (50a-c), wherein each rotator can comprise the same or similar structure and/or function. For clarity, the present description and figures will often reference a single identifying numeral when describing parts and/or elements of a rotator having the same or similar structure and/or function. For example, FIG. 1 depicts a powder coating system (10) comprising three rotators (50a-c) (e.g., subsystems), which comprises roller assemblies (55) having rollers (56). The rotators (50a-c) further comprise an arm (70) for loading and unloading the pipe (9) onto and from between the rollers (56), wherein the arm is depicted as a vertical plate, with an upper edge (71) having a slight angle or slope with respect to the ground. Because in the depicted embodiment of the powder coating system (10), the rollers (56) can comprise the same and/or similar structure and/or function, all of the rollers (56) will be identified by the same numeral in the description and the drawings for clarity. Similarly, because in the depicted embodiment of the powder coating system (10) the first and second coating apparatus (100a, 100b) comprise parts and/or elements, having the same or similar structure and/or function, such parts and/or elements will be identified by the same numeral in the description and the drawings for clarity.

Figure 2A:
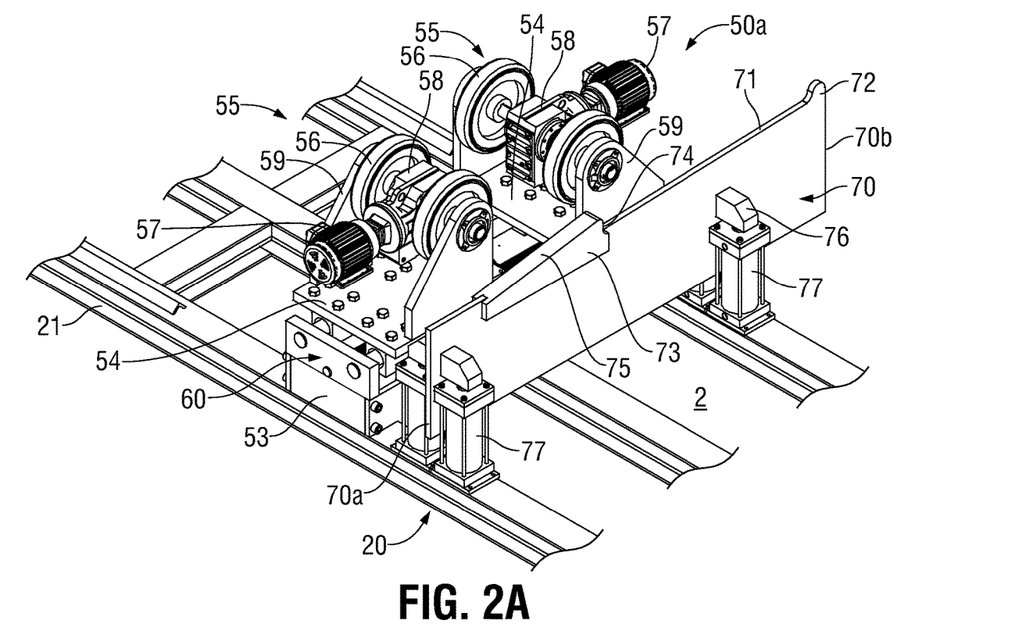
FIG. 2A depicts a close-up isometric view of a pipe rotator of the powder coating system depicted in FIG. 1.

Referring now to FIG. 2A, the Figure shows a close-up view of an embodiment the first rotator (50a) in accordance with the present disclosure. Specifically, the first rotator (50a) is shown comprising two sets of roller assemblies (55), each comprising a pair of rollers (56) connected to an electrical motor (57) by a gearbox (58), which can reduce the speed of the rollers (56), while increasing the torque of the rollers (56) to enable the rotation of both light and heavy tubulars (9) positioned on top of or between the rollers (56). As further depicted in FIG. 2A, each roller assembly (55) is shown connected to a mounting plate (54) by two support plates (59). Each mounting plate (54) is further depicted positioned on opposing sides of a linear slide (60), which enable the roller assemblies (55) to move toward and away from each other to accommodate small and large pipe, which are to be positioned on top of or between the rollers (56) of opposing roller assemblies (55). The linear slide (60) can be mounted directly to the longitudinal beams (21) of the frame (20) or by using a transition or a mounting plate (53).

The first rotator (50a) is further depicted comprising an arm (70) for loading and unloading a pipe (9) onto and from between the rollers (56). In FIG. 2A, the arm is depicted as a vertical plate having a first end (70a), a second end (70b), and an upper edge (71) having a slight angle, or a slope, with respect to the ground (2). The arm (70) can comprise a protrusion (72), located adjacent to the second end (70b) of the upper edge (71). During coating operations, the protrusion (72) can maintain a pipe on the upper edge (71) of the arm and/or prevent the pipe from rolling off of the arm (70). The arm (70) can further comprise a wedge shaped protrusion referred to as an extending member (73) positioned about the upper edge (71), adjacent the space between the roller assemblies (55). The extending member (73) is depicted comprising a sloping upper edge (75) and a side edge (74), which can be adapted to prevent the pipe (9) from rolling. The portion of the extending member (73) closest to the first end (70a) of the arm (70) is shown being even with the upper edge (71), while the opposite end of the extending member (73), closest to the second end (70b) of the arm (70), extends above the upper edge (71) to form the surface of the side edge (74), which can maintain a pipe (9) in position during coating operations. The arm (70) can be moved vertically toward and away from the frame (20) by a plurality of fluid cylinders (77). The end cap portions of the cylinders (77) are shown mounted to the longitudinal beams (21) while the cylinder rods are shown connected to the arm (70) with lateral brackets (76) connected to the arm (70).

As shown in FIG. 1, the first rotator (50a) can be fixedly positioned on the support frame (20) in close proximity to the first coating apparatus (100a), while the second rotator (50b) can be fixedly positioned on the support frame (20) at an intermediate position between the first and third rotators (50a, 50c), wherein the second rotator (50b) can support an intermediate portion of the pipe (9). In an embodiment of the powder coating system (10), the second rotator (50b) can have a substantially similar or same structure and function and can comprise substantially similar or the same elements as the first rotator (50a), described above.

Figure 2B:
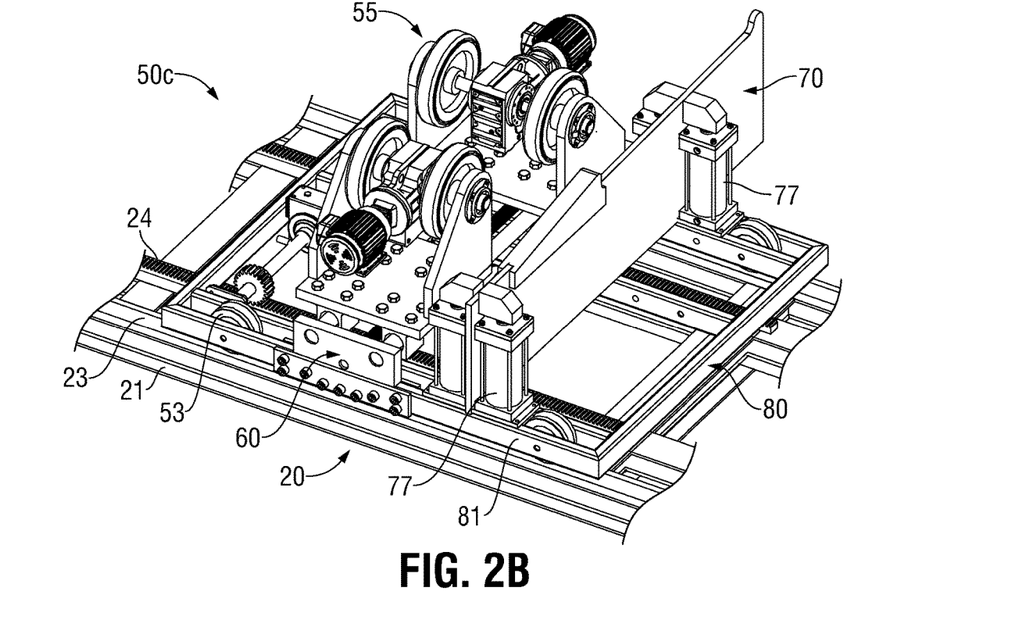
FIG. 2B depicts a close-up isometric view of another pipe rotator of the powder coating system depicted in FIG. 1.
Figure 2C:
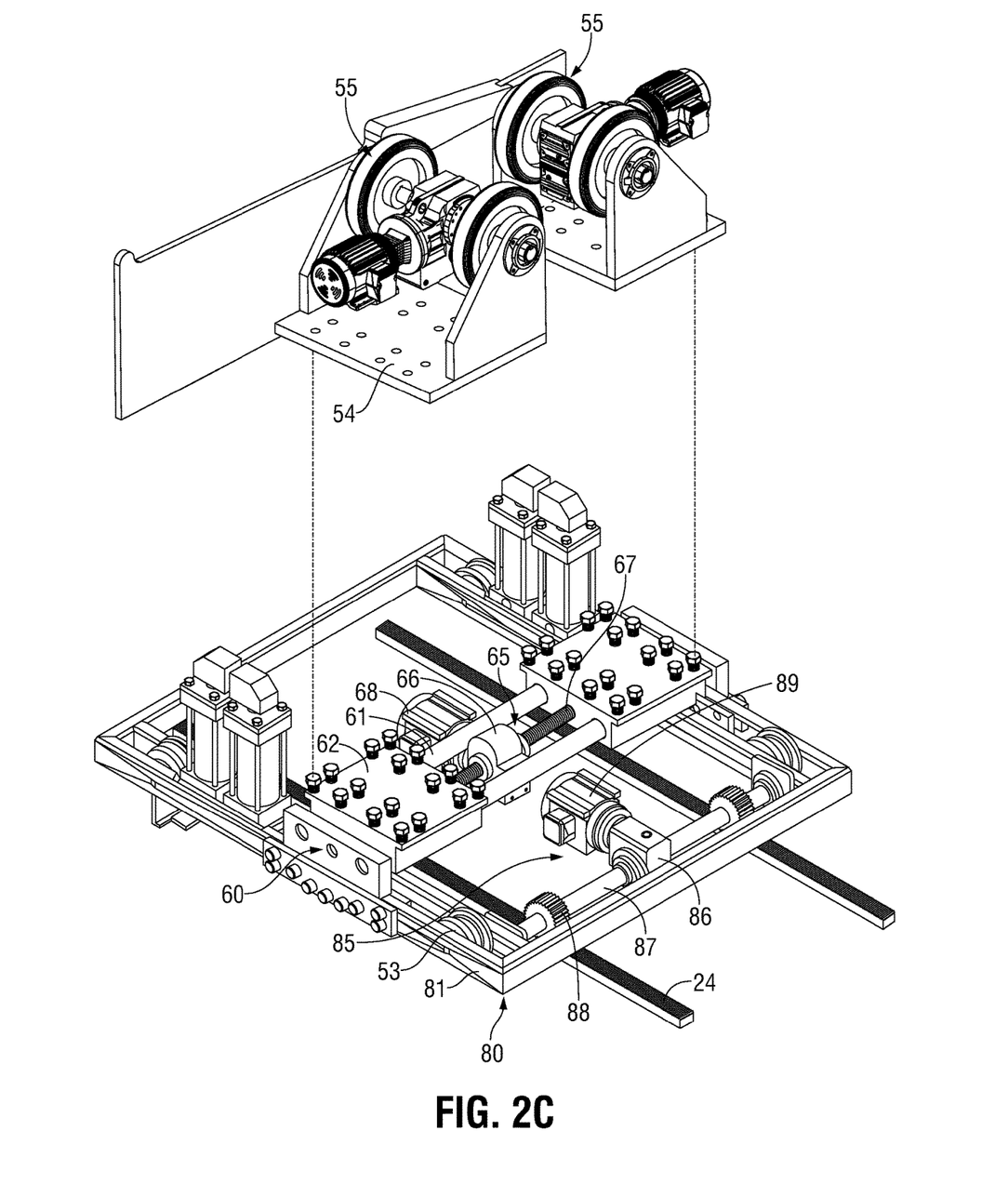
FIG. 2C depicts an exploded view of the pipe rotator depicted in FIG. 2B.

The third rotator (50c), depicted in FIGS. 1, 2B, and 2C, is shown comprising a similar structure and function as the first and second rotators (50a, 50b). Specifically, the third rotator (50c) is shown comprising roller assemblies (55), a linear slide (60), and a vertically movable arm (70), having a structure and function substantially similar or the same as the previously described first and second rotators (50a, 50b). Unlike the first and second rotators (50a, 50b), FIG. 2B shows the third rotator (50c) comprising cylinders (77) and a linear slide (60) fixedly connected to a rotator frame assembly (80), not the longitudinal beams (21) of the support frame. The rotator frame assembly (80) can comprise a plurality of beams (81) supporting the cylinders (77) and the linear slide (60) thereon. The rotator frame assembly (80) further comprises a plurality of wheels (53) rotatably connected to the beams (81). Similarly to the wheels (113) of the coating apparatus (100a, 100b), rotator wheels (53) can be adapted to engage the rail (23) to roll along the frame (20).

Furthermore, the third rotator (50c) can be actuated to roll along the frame (20) by a drive assembly (85), depicted in FIG. 2C showing an exploded view of the third rotator (50c). The drive assembly (85) is shown comprising a drive axle (87) having a gear (88) on each end, wherein the drive axle can be connected to an electrical motor (89) by a gearbox (86), which can reduce the speed of the gears (88), while increasing the output torque at the gears (88). FIG. 2C further shows the gears (88) engaging the toothed bar (24), whereupon energizing the motor (89), the third rotator (50c) can be moved along the frame (20) towards or away from the second rotator (50b).

Referring again to FIG. 2C, the Figure further shows the structure of the linear slide assembly (60). Specifically, FIG. 2C shows the linear slide (60) comprising guide rods (61) having a plurality of mounting brackets (62) positioned thereon for slidably connecting the mounting plates (54) to the linear slide (60). The roller assemblies (55) can be actuated to move toward or away from each other along the linear slide (60) by a drive assembly (65). As further depicted in FIG. 2C, the drive assembly (65) is shown comprising a worm gear (67) extending parallel and adjacent to the guide rods (61), and through a complementary tapped throughbore in the guide mounting brackets (62), wherein rotation of the worm gear (67) can move or translate the mounting brackets (62) and the mounting plates (54) along the guide rods (61). The worm gear (67) can be connected to an electrical motor (68) by a gearbox (66), which can reduce the rotating speed of the worm gear (67), while increasing the torque of the worm gear (67) to move the roller assemblies (55). As previously stated, the linear slide assembly (60) and the drive assembly (65), as described, can be incorporated into the first and second rotators (50a, 50b) to move the corresponding roller assemblies (55) toward and away from each other to accommodate smaller and larger tubulars.

Referring again to FIG. 1, the Figure further depicts the first and second coating apparatus (100a, 100b) of the powder coating system (10) as comprising a frame assembly (110) that can be usable to maintain the individual components and subsystems of each coating apparatus (100a, 100b) in relative position. The frame assembly is depicted comprising a plurality of horizontal and vertical beams, wherein the top horizontal beam supports the fluid bed (160) and the storage hopper assembly (200). The lowermost horizontal beams contain the plurality of wheels (113) for rolling each coating apparatus (100a, 100b) along the support frame (20). Each coating apparatus (100a, 100b) can further comprise a linear actuator, such as a fluid powered cylinder, positioned between the frame assembly (110) and the support frame (20), which can be usable to move each coating apparatus (100a, 100b) along the support frame (20). In an embodiment of the powder coating system (10), a cap end of each fluid powered cylinder can be connected to a portion of the support frame (20), while the rod end can be connected to the frame assembly (110), whereby extending or retracting the cylinder can move the coating apparatus (100a, 100b) along the support frame (20).

Figure 3A:
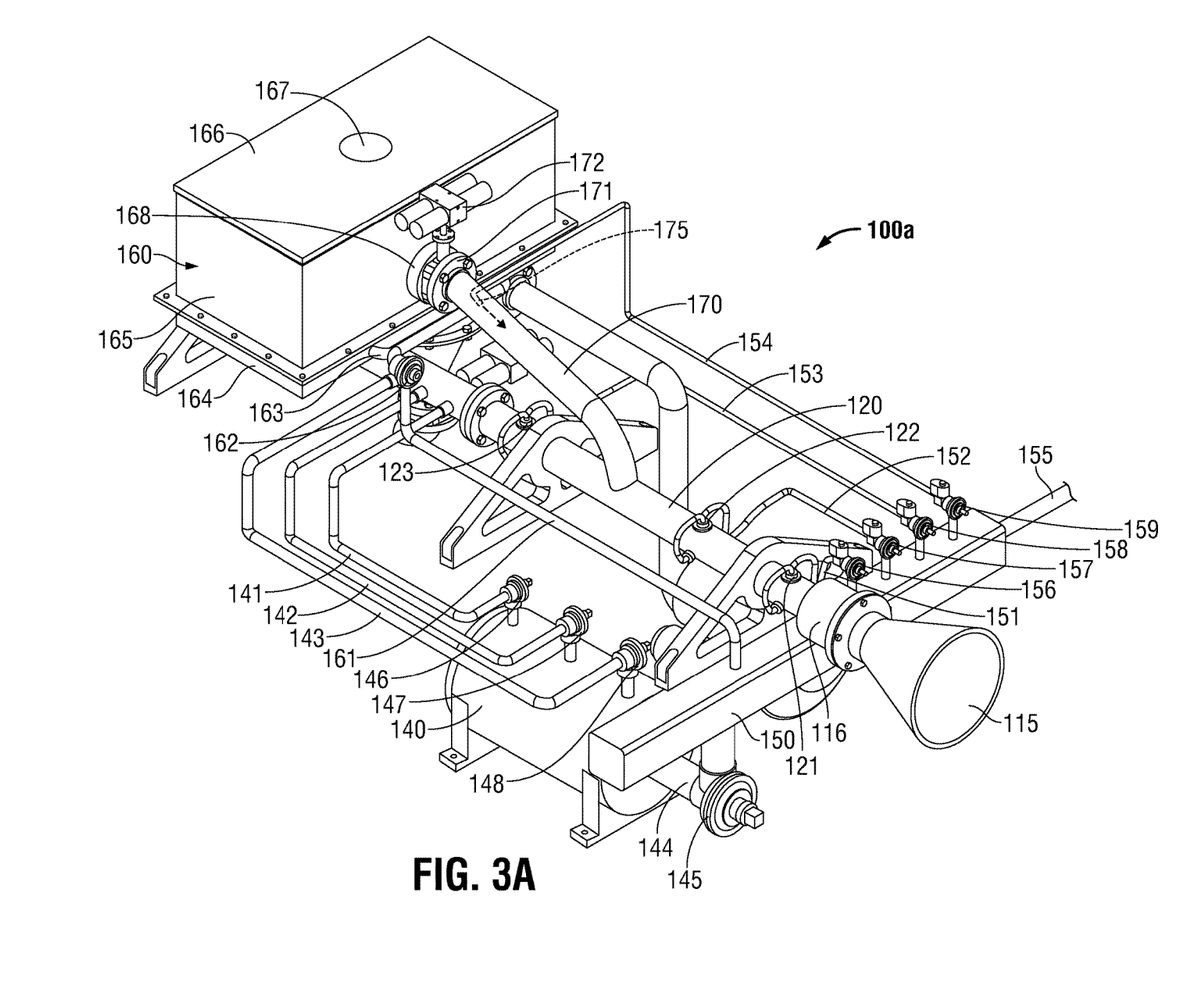
FIG. 3A depicts a top isometric view of an embodiment of a first coating apparatus of the powder coating system depicted in FIG. 1.
Figure 3B:
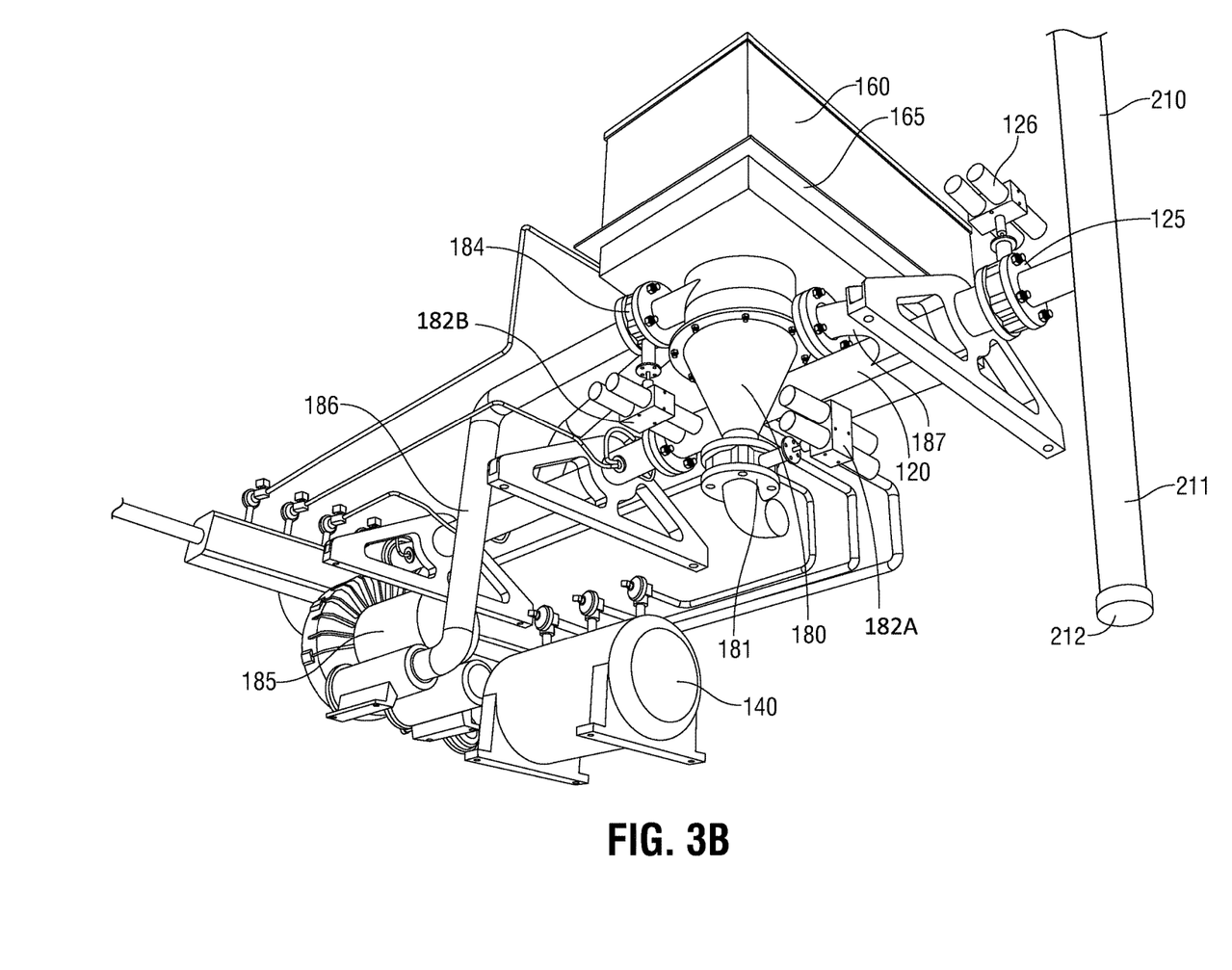
FIG. 3B depicts a bottom isometric view of the first coating apparatus depicted in FIG. 3A.
Figure 3C:
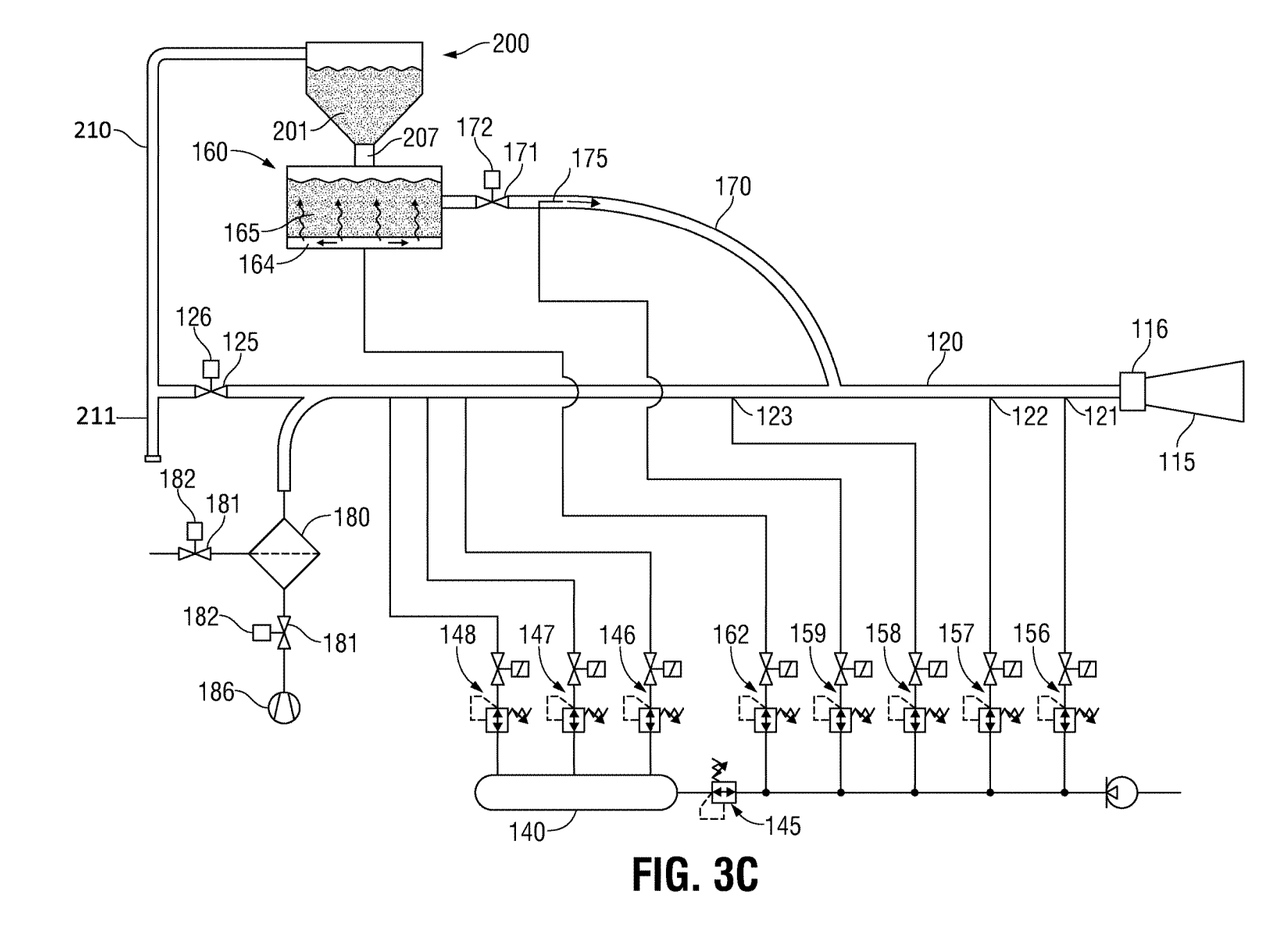
FIG. 3C depicts a schematic drawing of the first coating apparatus depicted in FIGS. 1, 3A, and 3B.

FIG. 1 shows oppositely positioned rotatable cones (115), wherein the wide open ends of cones (115) can face each other to receive therein and seal against the pipe (9). It should be noted that the shape of the cones (115) allows various pipe of different sizes to be contained therein, and to connect the pipe to the front end of the coating barrel (120, see FIG. 3A). Referring also to FIGS. 3A and 3B, the Figures show top and bottom isometric views of the first coating apparatus (100a), while FIG. 3C depicts a schematic view of the first coating apparatus (100a) in accordance with the present disclosure. The narrow ends of the first cone (115) are shown connected to a rotating joint (116), which can comprise internal radial bearings (not shown) to allow free rotation of the cone (115), while being connected to the coating barrel (120). Because the coating apparatus (100a, 100b) are movable along the frame (20), the cones (115) can receive therein and seal against pipe of various lengths. When the pipe (9) ends are positioned within the cones (115), the previously described rotators (50a-c) can rotate the pipe (9) at a desired speed.

The coating material usable with the powder coating system (10) can be a thermosetting or thermoplastic compound that can fusion bond to the inner surface or wall of a pipe (9) when heated above the fusion temperature of the coating material. The material can be comminuted to a powder of a particle size(s) that will be supported by the gas or airflow rate within the pipe. For purposes of this application, gas shall include any gaseous mixture which may include fluids and small particles, for example, air. As further illustrated in FIGS. 3A and 3B, the powder coating system (10) can comprise a generally rectangular container for the coating material, called a fluid bed (160). The fluid bed can comprise a coating material container (165) and a cover (166) with an aperture (167) therein to admit the coating material into the coating material container (165). Inlets (163) in the base of fluid bed (160) allow air or other gas(es) to be introduced into the gas receiving chamber (164), located below the coating material container (165). A gas permeable membrane (not shown) can keep the coating material out of gas receiving chamber (164) while allowing gas to enter the bottom of the coating material container (165). As a result of the introduction of gas into the fluid bed (160), coating material can be aerated and can behave much as a fluid. Furthermore, an outlet port (168) is shown located low on the side of the fluid bed (160) and above the permeable membranes, with a quick shut-off valve (171) connected at the outlet port (168). The quick shut-off valve (171) can be operated by any means in the art, including a fluid rotary actuator (172), depicted in FIG. 3A.

Pressurized air can be introduced into the air receiving chamber (165) by a conduit (161) extending from an air manifold (150), which can receive compressed air from a compressor (not shown) by an air supply conduit (155). FIG. 3A further depicts a diaphragm type air pressure regulator and flow shut-off combination valve, referred to as a pressure and flow regulator (162), which is adapted for both regulating downstream pressure and independently shutting off gas flow therethrough. The pressure and flow regulator can be actuated to the open or closed position by an electrical coil or by any other means known in the art, including a fluid rotary actuator. Although the pressure and flow regulator (162) is depicted as a single member, in other embodiments of the powder coating system (10), the pressure regulator and the fluid flow shut-off valve of the pressure and flow regulator (162) can be separate devices that can be connected in line. It should be noted that any of the pressure and flow regulators, described hereinafter, can be replaced by individual pressure regulators and shut-off valves and that any of the pressure and flow regulators, described hereinafter, can be actuated by any means known in the art. Using pressure and flow regulators, a predetermined and adjustable amount of gas, such as air at regulated pressures, can be introduced into the system in accordance with the desired operation.

The powder coating system (10), including the various pressure and flow regulators disclosed herein, can be governed by a programmable controller or computer (not shown), which receives information concerning the length of the pipe (9) to be coated as well as the diameter of the pipe (9); and then, the controller or computer signals the various shut-off valves and pressure and flow regulators as to the length of time, the amount of pressure, and in what particular sequence the valves and regulators should be opened. Additionally, the shut-off valve (171) can be opened according to the specific requirements of each pipe, for various lengths of time, thereby admitting the appropriate amount of coating material for each pipe (9).

Further depicted in FIGS. 1 and 3C, is a coating material storage hopper assembly (200) used to store the coating material and dispense the coating material into the fluid bed (160) as the coating material is used during the course of the coating operations. The storage hopper assembly (200) can comprise a main container (201) supported above the fluid bed (160) by a frame (205). The main container (201) can include upper doors (202) to enclose the coating material within the main container (201). The main container (201) can be positioned above the fluid bed (160) for conveniently dispensing the coating material therein. A gate valve (207), which can be operated by a motor or a fluid rotary actuator, is further shown at the bottom of the storage hopper (201). The gate valve (207) can be used to feed the coating material into the fluid bed (160) through the aperture (167) in the cover (166). FIG. 1 further depicts a return tube (210), connecting the back end of the coating barrel (120) with the main container (201) of the hopper assembly (200). During coating operations, the quick shut-off valve (125) can be opened to allow air and any excess coating material, not used up to coat the pipe (9) or directed into the collection hopper, to flow through the return tube (210) and into the main container (201) to be reused. As shown in FIGS. 3B and 3C, the bottom of the return tube (210) can extend below the quick shut-off valve to form a particle collector (211), which can collect the larger pieces of coating material that are too heavy and/or too large to be transferred back into the main container. The particle collector (211) can comprise a bottom plug (212) that can be opened to clean out the particle collector (211).

Figure 5:
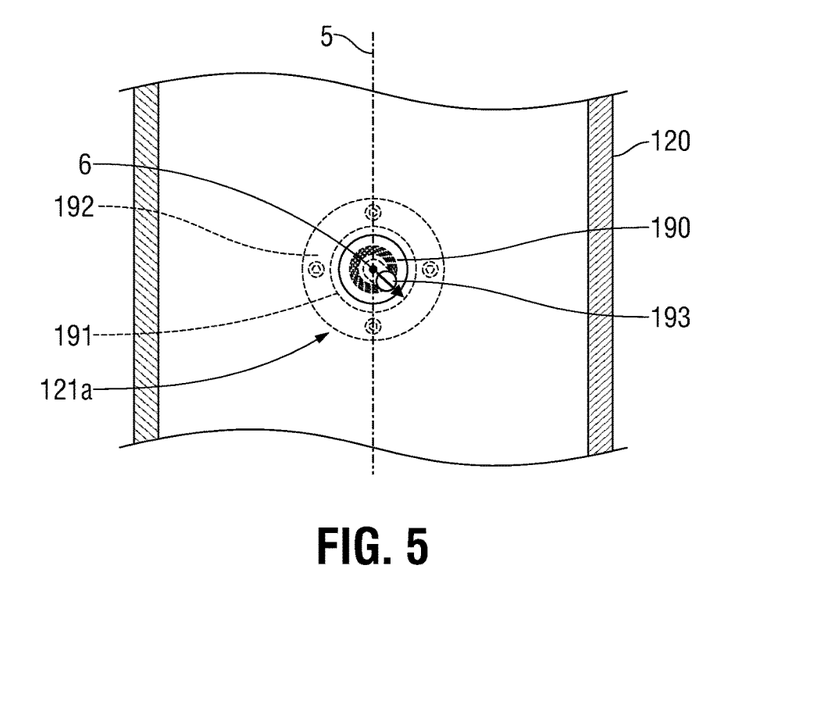
FIG. 5 depicts a cross sectional top view of an embodiment of the coating barrel in accordance with the present disclosure.

As further illustrated in FIGS. 3A, 3B, and 3C, attached to the quick shut-off valve (171) is a tubular inlet conduit, which is referred to as a feed tube (170) that can be usable for introducing or feeding the coating material from the fluid bed (160) into a centrally positioned elongated tubular member, referred to as the coating barrel (120), during coating operations. The feed tube (170) is shown connected with the coating barrel (120) at a negative angle with respect to a vertical axis, wherein the feed tube (170) can be angled slightly backwards at the junction with the coating barrel (120). However, in another embodiment of the coating system (10), the feed tube (170) can be connected with the coating barrel (120) at a 90 degree angle, or other angle for permitting the connection. The coating barrel (120) is depicted having a generally straight configuration with a bore extending longitudinally therethrough along the central axis ((5), see FIG. 5) thereof.

The feed tube (170) can further contain, adjacent to the shut-off valve (170), an internal nozzle (175), directed along the central axis of the feed tube (170), away from the fluid bed (160), for drawing coating material from the fluid bed (160). The internal nozzle (175) can provide a push-pull effect on the coating material in the fluid bed (160) when the shut-off valve (171) is opened. While the pressure inside the fluid bed (160) pushes the coating material into the feed tube (170), the air flow from the internal nozzle (175) can generate suction to further draw the coating material from the fluid bed (160). The air flow within the feed tube (170) can promote air suspension of the coating material particles, thus forming a "cloud" of particles of coating material.

Pressurized air can be supplied to the nozzle (175) by a fluid conduit (154), wherein the air pressure and flow can be controlled by a pressure and flow regulator (159) connected to the air manifold (150). When the shut-off valve (171) and the pressure and flow regulator (159) are opened for a predetermined period of time, a predetermined amount of fluidized coating material can be drawn from the fluid bed (160), by the air flow generated by the nozzle (175), and communicated through the feed tube (170) into the coating barrel (120). The coating barrel (120) is shown extending the length of the first coating apparatus (100a), wherein the first end (e.g. front end) of the coating barrel (120) can be connected to the rotating joint (116), and the second end (e.g., back end) of the coating barrel (120) can have a quick shut-off valve (125) attached thereto, to open and close the second end of the coating barrel (120) and to connect with the coating material return tube (210). The quick shut-off valve (125) can be operated by any means in the art, including a fluid rotary actuator (126).

FIGS. 3A and 3C further depict three air supply conduits (141, 142, 143) that can be connected to the coating barrel (120), toward the second end of the coating barrel (120). The air supply conduits introduce pressurized air into the coating barrel (120) for moving the coating material out of the coating barrel (120) after the coating material is introduced into the coating barrel (120) from the fluid bed (160). The depicted conduits (141, 142, 143) can comprise different diameters of pipe to supply different volumetric flow rates of pressurized air into the coating barrel (120), wherein the larger conduit (143) can supply a larger quantity of air than the medium conduit (142), and wherein the medium conduit can supply a larger quantity of air than the smaller conduit (141). The conduits (141, 142, 143) can receive air from an air tank (140), which can store pressurized air that is supplied from the compressor (not shown). Each conduit (141, 142, 143) can comprise a pressure and flow regulator (146, 147, 148) along the length thereof, between the air tank (140) and the coating barrel (120), wherein each pressure and flow regulator (146, 147, 148) can be appropriately sized for each conduit (141, 142, 143). During coating operations, the pressure and flow regulators (146, 147, 148) can be opened or closed individually or in combinations, to supply the appropriate volumetric flow rate into the coating barrel (120). If larger volumetric flow rates are needed, because, for example, a large diameter pipe is being coated, a combination of two or all three pressure and flow regulators can be opened to communicate air from the air tank (140) to the coating barrel (120). Air can be communicated from the compressor to the air tank (140) through the main air supply conduit (155), the air manifold (150), and/or an intermediate conduit (144) extending between the air manifold (150) and the air tank (140). The air pressure inside of the air tank can be controlled by a pressure regulator (145).

Referring again to FIGS. 3B and 3C, the Figure depicts a collection hopper (180) connected to the coating barrel (120), adjacent to the shut-off valve (125). A tubular segment (187) is shown connecting the collection hopper (180) to the coating barrel (120), and another tubular segment (186) is shown connecting the collection hopper (180) with a vacuum generator (185). In an embodiment, the vacuum generator (185) can be one unit (as shown). In an alternative embodiment, the vacuum generator can be a plurality of vacuum generators (not shown) working separately or together in accordance with the design and operational needs of the operator. The vacuum generator or vacuum generators can be engineered to be on different sections of the apparatus and not just as shown in FIGS. 3B and 3C. During coating operations, the vacuum generator (185) can draw air and excess coating material that is entering the coating barrel (120) at the end of each coating cycle. A shut-off valve (184) can be opened with a rotary actuator (182B) to allow the air and the coating material to be drawn from the coating barrel (120) and to flow through the collection hopper (180). When the shut-off valve (184) is opened, the drawn coating material is filtered out by an internal filter (not shown), located within the collection hopper (180), so that none of the excess coating material or coating material byproducts are released into the atmosphere. The internal filter can be removed and replaced after being cleaned. Once the collection hopper (180) is filled with unused coating material, a rotary actuator (182A) can be actuated to open the shut-off valve (181) to allow most of the coating material to be evacuated from the collection hopper (180).

Referring again to FIG. 3A, individual nozzles, within each set of nozzles (121, 122, 123), can be interconnected by conduits (151, 152, 153), which extend between each nozzle so that the gas or air pressure, supplied to each nozzle of a particular set of nozzles (121, 122, 123), is the same. Furthermore, the size, airflow characteristics, and air flow direction of each nozzle of each set of nozzles (121, 122, 123) can be similar or the same so that each nozzle of each set of nozzles (121, 122, 123) can cooperatively and uniformly induce the desired deflection of air flow within the coating barrel (120). As further depicted in FIGS. 3A, 3B, and 3C, conduits (151, 152, 153) further connect each set of nozzles (121, 122, 123) with the air manifold (150). Pressure and flow regulators (156, 157, 158) control the pressure and flow of air into the sets of nozzles (121, 122, 123), allowing each set of nozzles (121, 122, 123) to be set to operate at different pressures or to be shut-off independently of the other set of nozzles (121, 122, 123).

Figure 4:
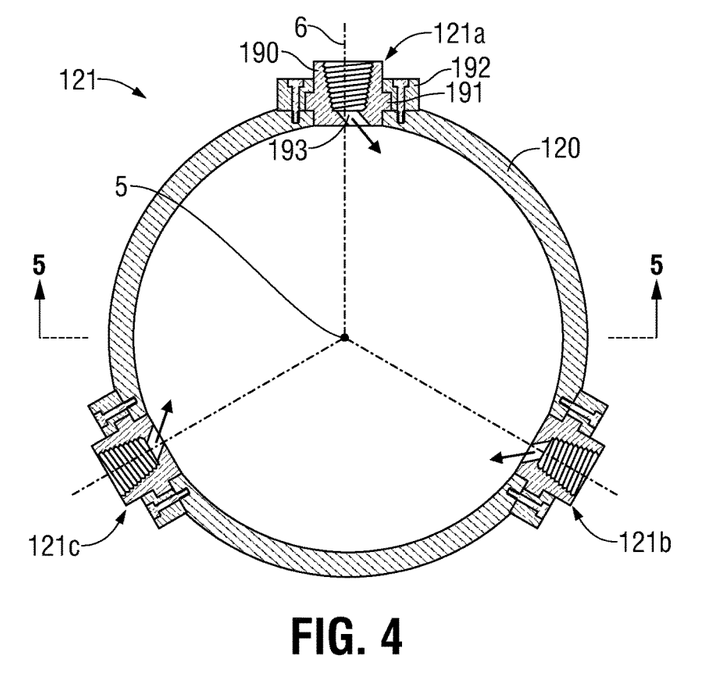
FIG. 4 depicts a cross sectional axial view of an embodiment of a coating barrel in accordance with the present disclosure.

Referring also to FIG. 4, the Figure depicts a cross-sectional view of the coating barrel (120) and the first set of gas nozzles (121). Specifically, the Figures show the powder coating system (10) with the coating barrel (120) having three sets of gas nozzles (121, 122, 123) positioned along the length thereof, wherein each set of nozzles (121, 122, 123) can be axially spaced along the coating barrel (120) between each end. Each set of nozzles (121, 122, 123) is shown having three individual nozzles circumferentially spaced at 120 degree intervals about the central axis (5) of the coating barrel (120). Each nozzle (121, 122, 123) can be selectively oriented to direct a jet of air into the central bore of the coating barrel (120), at a diagonal angle with respect to the central axis (5), to cause the air flowing therethrough to flow in a spiral manner, comprising both axial and circumferential flow components.

In an embodiment, the pitch of the nozzles (121, 122, 123) can be selectively adjusted to direct a jet of air into the central bore of the coating barrel (120), at a desired diagonal angle with respect to the central axis (5). As discussed above, this causes the gas or air flowing therethrough to flow in a spiral manner, comprising both axial and circumferential flow components, which mixes the powder and the gas. The pitch of the nozzle influences the amount of mixing between the powder and gas and adhesion with the tubular. Typically, all three nozzles (121, 122, 123) are oriented 30 degrees toward the rotatable cone 115. Orienting the pitch of one or more of the nozzles more toward the rotatable cone 115 will reduce the mixing between the powder and gas and reduce adhesion with the tubular. Conversely, orienting the pitch of one or more of the nozzles (121, 122, 123) toward the feed tube 170 would result in increased mixing between the powder and gas and increased adhesion with the tubular. In one embodiment, any nozzle can be adjusted manually by opening and adjusting a bezel on any one of the nozzles (121, 122, 123).

In various embodiments, the pitches of the nozzles could be operated individually or in concert. For example, a bell crank can adjust one nozzle individually, two nozzles, or all three nozzles together by having the bell crank connected to one, two, or all three nozzles respectively. In one embodiment, the adjustment by the operator can be automated wherein each nozzle can be controlled by a controller controlling at least one or a plurality of separate nozzle motors. The controller for the nozzles can be connected to the nozzle motors 199 with wires or through wireless communication. A computer running a program to operate the controller adjusting the pitch of nozzles (121, 122, 123) can be utilized to determine the most favorable pitch angle of the nozzles based on operating conditions and desired properties of the coating materials. The computer program could also be used to automatically, in real time, adjust the nozzles (121, 122, 123) based on the operating conditions to obtain favorable coating material properties.

The word "spiral" describes the shape of the air flow and the shape of the flow of the coating material through the coating barrel (120). As used herein, the word spiral refers to a helical or coiled shape. Specifically, the spiral movement has a longitudinal or axial component and a tangential or circumferential component. The coating material can move tangentially with respect to the central axis (5) at the inside surface of the coating barrel (120), wherein the inside surface of the coating barrel continually redirects the gas and coating material flow circumferentially along the inside surface of the coating barrel (120). The coating material can also move axially, wherein the coating material can flow along the inside surface of the coating barrel (120), along a direction parallel to the central axis (5) and toward the front end of the coating barrel (120). As the shape of the spiral movement is substantially circular or ring like, centrifugal force will maintain the coating material particles at or near the inside surface and away from the center or axis of the coating barrel (120) and the tubulars being coated. Therefore, because of the spiral movement, the density of the coating material particle cloud can be less, along the central axis (5) of the coating barrel (120) and the tubular being coated, than along the inside diameter or inside wall surface thereof.

During each coating sequence, pressurized air from the conduits (141, 142, 143) enters the coating barrel (120) and moves toward the front end of the coating barrel (120). The air is then deflected by directional air jets from the three sets of nozzles (121, 122, 123), resulting in spiral air movement as previously described. As the air flows though the coating barrel (120) in a spiral manner, toward the front end of the coating barrel (120), the air encounters the coating material particles that are entering the coating barrel (120) and deflects the coating material in the spiral direction. As the cloud of coating material spirals further downstream and past the nozzles (121, 122, 123), the spiral flow of coating material can be successively adjusted to comprise a greater circumferential flow component or a greater axial flow component. As the cloud of coating material exits the coating barrel (120), the cloud of coating material then spirals into the rotatable cone (115) and into the pipe (9) positioned within the cone (115).

The pipe (9) can be rotated in the opposite direction to the circumferential component of the spiral movement of the coating material. This increases the relative tangential or circumferential velocity of the coating particles at the inside surface of the pipe (9), and reduces dwell or residence time of the coating material particles at a given point on the inside surface of the pipe, whereby at higher air velocities, less coating is deposited on the hot pipe (9).

Referring again to FIG. 4, the Figure shows a cross sectional view of an embodiment of the coating barrel (120), which includes a cross sectional view of individual nozzles (121*a-c*) of the first set of nozzles (121). Each nozzle (121*a-c*), including the first nozzle (121*a*), comprises a nozzle body (190), which can be pivotally positioned within a hole in the wall of the coating barrel (120). The hole in the wall can be adapted to receive the nozzle body (190) and to allow the nozzle body (190) to pivot freely therein. The nozzle body (190) is further shown comprising a shoulder (191) positioned flush against the outer surface of the coating barrel (120). The outer surface of the coating barrel (120), adjacent to the hole in the wall of the coating barrel (120), can be flattened to facilitate flush contact of the shoulder (191) and the coating barrel (120) for preventing air from leaking therebetween. The nozzle body (190) can comprise a nozzle outlet (193) that can be adapted to direct air in a diagonal direction with respect to the vertical axis (6), which extends vertically through the center of the coating barrel (120). Although the nozzle outlet (193) is shown aligned at about a 45 degree angle with respect to the vertical axis (6), the nozzle body (190) can be constructed having other angles with respect to the vertical axis (6) to create spiral air flow within the coating barrel (120).

FIG. 4 further depicts a bezel (192) connected to the coating barrel (120) with bolts to capture the shoulder (191) of the nozzle body (190) beneath the bezel (192). The bezel (192) can compress the shoulder (191) against the coating barrel (120) wall, when the bolts are tightened, to prevent rotation or pivoting of the nozzle body (190). As further depicted in FIG. 4, the inner surface of the nozzle body (190) can be flush with the inside surface of the coating barrel (120) to prevent air drag or to minimize disturbance to the flow of air through the coating barrel (120). To adjust the direction or the angle of the nozzle outlet (193) in relation to the central axis (5), the bolts of the bezel (192) can be loosened, the nozzle body (190) can be rotated to a desired angle between the nozzle outlet (193) and the central axis (5), and the bolts can be re-tightened.

The present disclosure is further directed to an embodiment of a method or a process for coating the pipe (9) with the coating apparatus (10) described above. Prior to the start of the coating operations, the dimensions of the pipe (9), such as a length, an inner diameter, and an outer diameter, can be entered into the powder coating system (10) controller or computer (not shown) to calculate the amount of coating material that will be required to coat each pipe (9). The pipe dimensions can be used by the controller to control the operation of the plurality of motors, linear actuators, rotary actuators, and pressure and flow controllers in order to properly coat the pipe (9). Once the amount of coating material, which is needed to coat the specified pipe (9) to a given millage or thickness, is calculated, this and other data can be entered into the programmable controller to execute the coating sequence, which includes controlling variables such as volumetric air flow through the coating barrel (120), the amount of coating material that should be injected into the coating barrel (120), the amount of time that each shut-off valve should be opened or closed, and the rotting speed of the pipe (9). Prior to commencement of the coating operations, all the shut-off valves can be actuated or set to the closed position to prevent air flow therethrough.

Before the coating stage of the pipe coating process can start, the pipe can be heated to a desired temperature and ejected from the oven (not shown) onto pipe storage rack (not shown) or another pipe storage structure. The pipe can then be properly positioned for coating, between the cones (115) of the first and second coating apparatus (100*a*, 100*b*) and between the wheels (56) of opposite roller assemblies (55) on each rotator (50*a-c*), as depicted in FIG. 1. To properly position the pipe (9) for coating, the pipe can be first moved from the pipe storage rack and positioned on the upper edge (71) of the arms (70) of the first, second, and third rotators (50*a*, 50*b*). As the upper edges (71) of the arms (70) are sloping, the pipe (9) can roll along the upper edges (71) until the pipe (9) is stopped by the edge (74) of the extending members (73). Thereafter, the hydraulic cylinders (77) can retract to lower the arms (70) and position the pipe (9) between the wheels (56) of the opposite roller assemblies (55). Prior to positioning of the pipe (9) between the wheels (56), the spacing between the wheels (56) can be set by the linear slide assemblies (60), based on the preprogrammed physical dimensions of the pipe (9), whereby the pipe (9) can be positioned or wedged between the wheels (56), yet remain on top of the wheels (56) and not fall through or into the space between the wheels into contact with the arms (70). Once the pipe (9) is positioned between the wheels (56) of the rotators (50a-c), the first and/or the second coating apparatus can move toward each other to capture the pipe (9) between the opposing cones (115). The motors (57) in each rotator (50a-c) can then be energized to rotate the pipe (9) and the cones (115), and the pipe is now ready for the coating sequence.

In order to evenly coat the pipe (9) with the coating material, the powder coating system (10) can be used by performing several specific steps or actions listed below. Referring again to FIGS. 3A, 3B, and 3C, the coating stage of the coating process can begin by establishing the spiral air flow inside the coating barrel (120) of the first coating apparatus (100a) and the pipe (9) being coated. This may be achieved by turning on the compressor (not shown) to store pressurized air or gas in the air tank (140) and, based on the diameter and length of the pipe (9), open one or more pressure and flow regulators (141, 142, 143) to feed pressurized air into the coating barrel (120). Furthermore, the pressure and flow regulators (156, 157, 158) of the first coating apparatus (100a) can be opened to feed pressurized air into the three sets of nozzles (121, 122, 123) to induce spiral motion into the air flowing through the coating barrel (120). Lastly, the vacuum generator (185) of the second coating apparatus (100b) can be turned on and the shut-off valve (184) can be opened to draw air from the pipe (9) into the coating barrel (120) of the second coating apparatus (100b). The pressure and flow regulators (141, 142, 143, 156, 157, 158) can be manually preset to a desired pressure to control the air pressure at the outlet of the pressure and flow regulators. In other embodiments (not shown) of the powder coating system (10), the outlet air pressure of the pressure and flow regulators (141, 142, 143, 156, 157, 158) can be electronically and/or remotely controlled by a controller and/or computer.

Once spiraling air flow is introduced in the pipe (9), the coating material can be introduced into the coating barrel (120) of the first coating apparatus (100a). Specifically, the rotary actuator (172) can open the shut-off valve (171) as the pressure and flow control valve (159) is opened to force air out of the internal nozzle (175). Simultaneously, the pressure and flow control valves (146, 147, 148) can be closed to prevent the introduction of air flow through conduits (141, 142, 143). Accordingly, the coating material is drawn from the fluid bed (160) and pushed though the feed tube (170) into the coating barrel (120) of the first coating apparatus (100a). As the coating material enters the coating barrel (120), the three sets of nozzles (121, 122, 123) induce the air and the coating material located inside the coating barrel (120) to spiral therein. Once a predetermined amount of coating material has been introduced into the coating barrel (120), the shut-off valve (171) is closed, preventing an inflow of the coating material.

The coating material, travelling in a spiral manner, will be forced outward and will expand outwardly immediately after exiting the first end of the coating barrel (120). The spiral motion can cause the coating material to move radially, as the coating material moves axially through the pipe (9), to coat the inside surface of the pipe with the coating material. As the spiraling cloud of coating material enters and moves through the pipe (9), the coating material settles and coats the inside surface of the pipe (9). Once all of the coating material moves from the coating barrel (120) into the pipe (9), the pressure and flow valves (156, 157, 158) can be closed to shut off flow to the nozzle sets (121, 122, 123).

Thereafter, as the cloud of coating material continues to move through the pipe (9) and reaches a mid-point along the length of the pipe, the cloud of coating material can be moved further by increasing the back pressure (e.g., pressure upstream from the moving coating material, pressure in the first coating apparatus (100a)) and shutting off suction generated by the second coating apparatus (100b). Specifically, when the cloud of coating material reaches about the mid-point along the length of the pipe (9), several actions can be performed at essentially the same time. First, the back end shut-off valve (125) of the second coating apparatus (100b) can be opened to allow any excess coating material particles to be deposited in the main container (201) of the first coating apparatus (100a). Second, one or more of the pressure and flow valves (146, 147, 148), of the first coating apparatus (100a), can open to introduce pressurized air into the coating barrel (120) for moving the coating material further through the coating barrel (120). Third, the vacuum shut-off valve (184) of the second coating apparatus (100b) can close to turn off suction at the coating barrel (120) of the second coating apparatus (100b). As the cloud of the coating material moves past the midpoint, along the length of the pipe (9), the coating material continues to adhere to the inside surface of the pipe until most or all of the coating material is used up, marking the end of the first coating cycle.

The second coating cycle can be the same or similar to the first coating cycle. Specifically, the sequence of steps described above can be performed by the opposite coating apparatus (100a, 100b), wherein the steps previously performed by the first coating apparatus (100a) can be performed by the second coating apparatus (100b), while the steps previously performed by the second coating apparatus (100b) can be performed by the first coating apparatus (100a). Once the second coating cycle is complete, the inside surface of the pipe (9) is coated with a second coat of the coating material and the pipe (9) can be removed from the rotators (50a-c).

Once the pipe (9) is ready for removal, the coating apparatus (100a, 100b) can roll away from each other, freeing the pipe (9) from the cones (115). Once again, the arm (70) can be lifted by the cylinders (77) until the upper edge (75) of the extending members (73) contact and lift the pipe (9). Once the pipe (9) clears the wheels (56), the pipe can roll along the upper edges (75, 71) until it rolls off the arm (70) and onto a collection rack or other container (not shown). A new uncoated pipe (not shown) can then be positioned on the rotators (50a-c), and the first and second coating cycles can be repeated.

While various embodiments usable within the scope of the present disclosure have been described with emphasis, it should be understood that within the scope of the appended claims, the present invention can be practiced other than as specifically described herein. It should be understood by persons of ordinary skill in the art that an embodiment of powder coating system (10) in accordance with the present disclosure can comprise all of the features described above. However, it should also be understood that each feature described above can be incorporated into the powder coating system (10) by itself or in combinations, without departing from the scope of the present disclosure.

What is claimed is:

1. A system for coating an interior surface of a tubular member comprising:
    a first coating apparatus comprising:
    an elongated barrel having a first end, a second end, and an axial bore extending longitudinally therethrough, wherein the first end of the elongated barrel is open;
    a conical member connected with the elongated barrel at the first end thereof, wherein the conical member connects with an end of the tubular member;
    a plurality of gas conduits directly connected to the elongated barrel, wherein the plurality of gas conduits communicate pressurized gas into the axial bore of the elongated barrel, wherein each gas conduit contains a gas flow control valve connected thereto for controlling the flow of gas through the gas conduit, wherein each flow control valve controls the flow of gas through each gas conduit independently from the other flow control valve;
    a first container for holding therein a coating material;
    an inlet conduit connected to the elongated barrel, wherein the inlet conduit communicates the coating material from the first container into the axial bore of the elongated barrel, wherein the inlet conduit is connected to the elongated barrel between the plurality of gas conduits and the first end of the elongated barrel; and
    a plurality of gas nozzles directly connected to the elongated barrel, wherein the plurality of gas nozzles introduces pressurized gas into the axial bore of the elongated barrel to induce a spiraling gas flow through the axial bore toward the first end of the elongated barrel, wherein the spiraling gas flow causes the coating material to spiral as the coating material moves through the axial bore of the elongated barrel and the tubular member.

2. The system of claim 1, further comprising:
    a second coating apparatus for coating the interior surface of the tubular member, wherein the first coating apparatus and the second coating apparatus are movable toward and away from each other along a support frame; and
    a plurality of rotator apparatus positioned between the first and second coating apparatus, wherein each rotator apparatus comprises a plurality of wheels for rotating a tubular member positioned thereon.

3. The system of claim 1, wherein the plurality of gas conduits are connected to the elongated barrel between the second end of the elongated barrel and the plurality of gas nozzles.

4. The system of claim 1, wherein at least one gas conduit of the plurality of gas conduits comprises a different diameter, wherein at least one gas conduit of the plurality of gas conduits comprises a different gas flow capacity.

5. The system of claim 1, wherein the plurality of gas conduits comprises at least three gas conduits and at least one gas nozzle of the plurality of gas nozzles is located between the inlet conduit and the gas conduit closest to the inlet conduit.

6. The system of claim 1, further comprising:
    a second container for holding additional coating material, wherein the second container is positioned adjacent to the first container, and wherein the second container feeds the additional coating material into the first container; and
    a return conduit connected to the second container and to the elongated barrel, wherein the return conduit connects at or adjacent to the second end of the elongated barrel, and wherein the return conduit communicates from the elongated barrel into the second container the coating material that has passed through the tubular member and into the elongated barrel.

7. The system of claim 1, further comprising:
    at least one vacuum generator connected to the elongated barrel, wherein the at least one vacuum generator is connected at or adjacent to the second end of the elongated barrel; and
    a filter connected between the at least one vacuum generator and the elongated barrel by a conduit, wherein the at least one vacuum generator draws gas and the coating material, that has passed through the tubular member into the elongated barrel, through the filter to separate the gas from the coating material.

8. The system of claim 1 wherein at least one pitch of the plurality of gas nozzles can be selectively adjusted.

9. The system of claim 7 wherein the at least one vacuum generator comprises a plurality of vacuum generators.

10. The system of claim 8 further comprising at least one nozzle motor controlled by a controller to operate in real time the at least one pitch of the plurality of gas nozzles.

* * * * *